United States Patent [19]

Juso et al.

[11] Patent Number: 4,752,840
[45] Date of Patent: Jun. 21, 1988

[54] MULTITRACK MAGNETIC RECORDING AND REPRODUCING DEVICE

[75] Inventors: Hiromi Juso, Gose; Kengo Sudoh; Yukihiko Haikawa, both of Higashihiroshima, all of Japan

[73] Assignee: Sharp Kabushiki Kaisha, Osaka, Japan

[21] Appl. No.: 65,130

[22] Filed: Jun. 22, 1987

Related U.S. Application Data

[63] Continuation of Ser. No. 748,687, Jun. 25, 1985.

[51] Int. Cl.⁴ .................. G11B 5/09; G11B 20/10; G11B 20/18
[52] U.S. Cl. ........................ 360/22; 360/32; 360/63; 360/24; 371/39
[58] Field of Search .................. 360/22, 32, 53, 55, 360/47, 63; 371/38–40, 8

[56] References Cited

U.S. PATENT DOCUMENTS

| | | | |
|---|---|---|---|
| Re. 30482 | 1/1981 | Whitlock | 360/32 |
| Re. 31,166 | 3/1983 | Korda | 360/53 |
| 3,761,903 | 9/1973 | Bird, Jr. et al. | 371/8 X |
| 4,282,551 | 8/1981 | Kanazawa et al. | 360/53 X |
| 4,298,897 | 11/1981 | Arter et al. | 360/63 X |
| 4,328,580 | 5/1982 | Stockham Jr. et al. | 371/8 |
| 4,357,702 | 11/1982 | Chase et al. | 371/47 X |
| 4,382,299 | 5/1983 | Dieterich | 371/8 |
| 4,486,881 | 12/1984 | de Covasnon | 371/40 X |

Primary Examiner—Raymond F. Cardillo
Assistant Examiner—Alyssa H. Bowler
Attorney, Agent, or Firm—Flehr, Hohbach, Test, Albritton & Herbert

[57] ABSTRACT

A multitrack magnetic recording and reproducing device of the type, which converts analog signals into digital signals and records and reproduces such converted data by splitting onto a plurality of tracks, comprises heads for both high and low recording densities such that track pitches corresponding to them are at an integral ratio. It includes a reproducing circuit having detecting-decision making means such as multiplexers which, when information recorded by a head for lower recording density is reproduced by corresponding heads for higher recording density, is adapted to determine whether any of the outputs from these heads is incorrect.

2 Claims, 1 Drawing Sheet

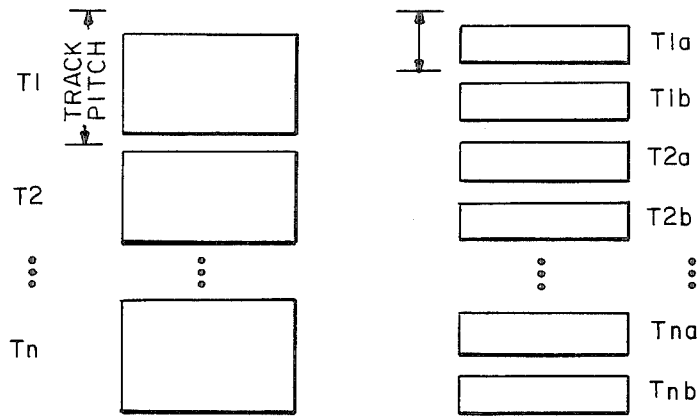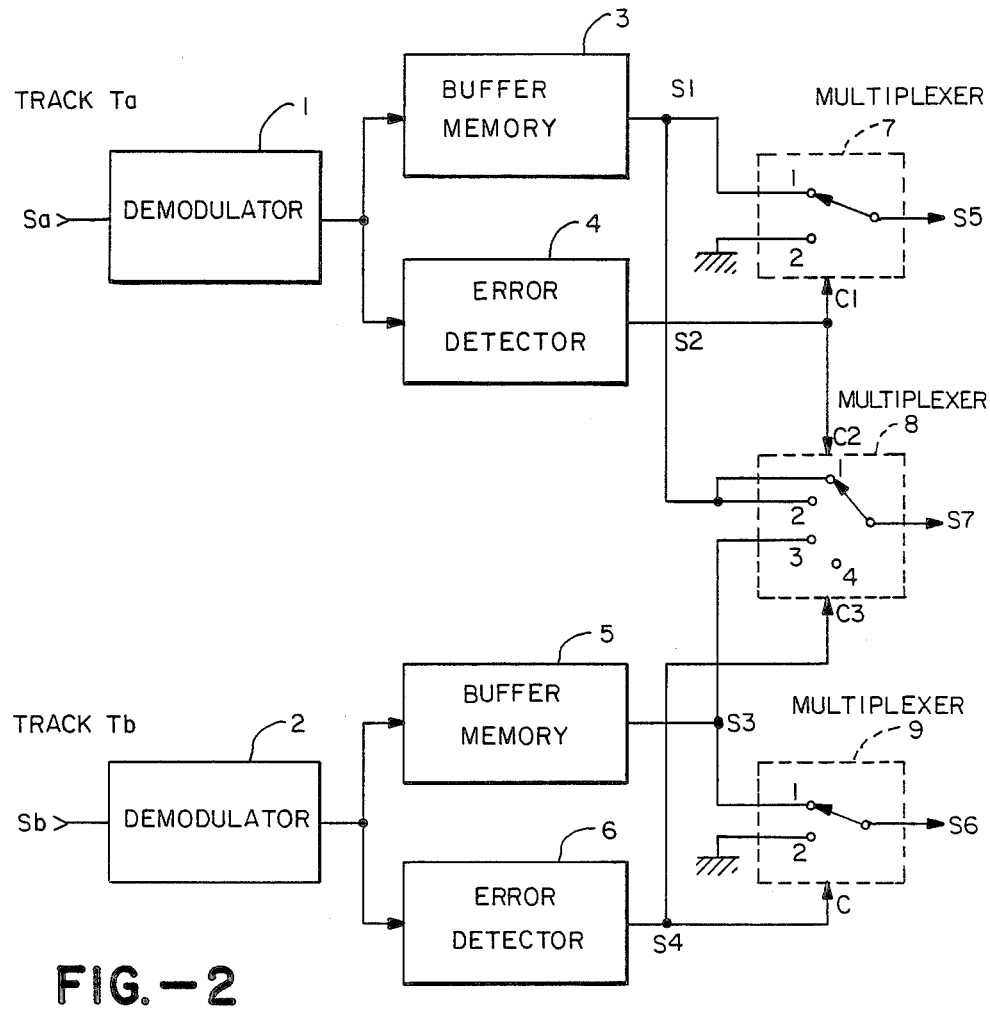

MULTITRACK MAGNETIC RECORDING AND REPRODUCING DEVICE

This is a continuation of application Ser. No. 748,687, filed June 25, 1985.

This invention relates to a multitrack magnetic recording and reproducing device and more particularly to such a device having a reproducing circuit which, when there are two or more track pitches at integral ratio or ratios, can reproduce from a magnetic medium recorded with a wider track pitch by using a reproducing head for a narrower track pitch.

Track pitch means the width occupied by a track. A multitrack magnetic recording and reproducing device is generally adapted to double the track pitch and reduce the recording density by 50% or to reduce the track pitch to one-half and double the recording density. Accordingly, if the track pitch is doubled, the total number of tracks becomes one-half.

FIG. 1 is a conceptual diagram for showing how recording is effected. Track pitch is made narrower for high recording density and wider for low recording density. The ratio of track pitch between high density and low density recording is integral (such as 1:2) so that signals recorded at low recording density, for example, can be reproduced by a reproducing device for high recording density. FIG. 1(A) represents tracks of low recording density and FIG. 1(B) represents tracks of high recording density.

If it is desired in the case of this example to use a reproducing device for high recording density to reproduce records from track of both types shown in FIG. 1(A) and FIG. 1(B), tracks $T_1, T_2, \ldots T_n$ of low recording density can also be reproduced by coupling $T_{1a}$ with $T_{1b}$, $T_{2a}$ with $T_{2b}$, ... and $T_{na}$ with $T_{nb}$ since $T_1$ corresponds to $T_{1a}$ and $T_{1b}$, $T_2$ to $T_{2a}$ and $T_{2b}$, ... and $T_n$ to $T_{na}$ and $T_{nb}$. This is carried out in the case of a conventional reproducing device by adding outputs from each track pair (such as $T_{1a}$ and $T_{1b}$) and taking them out as a data signal. One of the advantages of this method is that large signal outputs are obtainable since two outputs (from $T_{1a}$ and $T_{1b}$, for example) are added together so that the signal-to-noise ratio may be expected to improve. On the other hand, there is a possibility that one of the tracks may function rather as a source of noise due to clogging of the head, etc. In such a situation, the reproduced signal may become worse by the addition. Moreover, since the addition is not carried out digitally, a conversion circuit becomes necessary for analog signals. This means that the circuit becomes larger if the number of tracks is increased.

It is therefore an object of this invention in view of the above to provide a multitrack magnetic recording and reproducing device capable of high-quality reproduction by using digital circuits.

The above and other objects of this invention, which will become apparent from the detailed description given below, are achieved by providing a multitrack magnetic recording and reproducing device comprising a reproducing circuit which includes a demodulation circuit, a buffer memory, an error detection circuit, and multiplexers.

FIG. 1 is a schematic showing how recording is effected.

FIG. 2 is a simplified block diagram showing a reproducing circuit of a multitrack magnetic recording and reproducing device according to the present invention.

In FIG. 2, which is a conceptual block diagram of a reproducing circuit of a multitrack magnetic recording and reproducing device, numerals 1 and 2 are demodulation circuits, numerals 3 and 5 are buffer memories, numerals 4 and 6 are error detection circuits and numerals 7, 8 and 9 are multiplexers. Since this is a circuit corresponding to only one track, as many of these are necessary as there are tracks.

When reproduction is effected from high-density tracks (such as (B) of FIG. 1), the reproduction outputs $S_a$ and $S_b$ from the individual tracks are demodulated by the respective demodulation circuits 1 and 2 and inputted to the buffer memories 3 and 5 and the error detection circuits 4 and 6. The error detection circuits 4 and 6 check whether the demodulated signals are correct or incorrect, and the results are sent as outputs $S_2$ and $S_4$ to the multiplexers 7, 8 and 9. While the errors are being checked, the data are temporarily stored in the buffer memories 3 and 5. The multiplexers 7 and 9 are controlled by the outputs $S_2$ and $S_4$ from the error detection circuits 4 and 6. If the error detection circuits 4 and 6 decide that the data are correct, the outputs $S_1$ and $S_3$ from the buffer memories 3 and 5 are transferred as the outputs $S_5$ and $S_6$ from the multiplexers 7 and 9. If the error detection circuits 4 and 6 decide that the data are incorrect, the outputs $S_5$ and $S_6$ from the multiplexers 7 and 9 are adapted to be zero, or ground potential level. As a result, $S_5$ and $S_6$ are outputted as data from the individual tracks corresponding respectively to $S_a$ and $S_b$.

When reproduction is effected form low-density tracks (such as shown in FIG. 1(A)), the reproducing circuit of FIG. 2 can be used directly. The reproduction outputs $S_a$ and $S_b$ from the tracks $T_a$ and $T_b$ are generally the same and the final signal is outputted from the multiplexer 8 as output $S_7$. The multiplexer 8 is controlled by the outputs $S_2$ and $S_4$ from the error detection circuits 4 and 6, or the control signals $C_2$ and $C_3$, and switches 1, 2, 3 and 4 in the multiplexer 8 are appropriately selected. The relationship at this point between the control signals $C_2$ and $C_3$ and the switches 1, 2, 3 and 4 is shown below in Table I wherein control signals $C_2$ and $C_3$ are "0" for "correct" and "1" for "incorrect".

TABLE I

| $C_2$ | $C_3$ | Switch | Output |
|---|---|---|---|
| 0 | 0 | 1 | $S_1$ |
| 0 | 1 | 2 | $S_1$ |
| 1 | 0 | 3 | $S_3$ |
| 1 | 1 | 4 | 0 |

For example, if the signal $S_a$ from the track $T_a$ is "correct", the error detection circuit 4 sends a "correct" signal $S_2$ as control signal $C_2$ to the multiplexer 8. The switch 1 or 2 is selected and the output $S_1$ from the buffer memory 3 is transmitted as the output $S_7$. If the signal $S_a$ is "incorrect" and the signal $S_b$ from the track $T_b$ is "correct", a signal indicating that the output $S_4$ from the error detection circuit is "correct" is outputted. The switch 3 of the multiplexer 8 is selected and the output $S_3$ from the buffer memory 5 is transmitted as the output $S_7$. If both signals $S_a$ and $S_b$ are "incorrect", the switch 4 of the multiplexer 8 is selected and the output $S_7$ becomes zero, or ground potential level. Although multiplexers were used in the example described above, they may be replaced by any other detecting-decision making means as long as they have comparable functions.

In summary, the present invention relates to a device which converts analog signals to digital signals and records and reproduces such data by splitting them into a plurality of tracks having track pitches for high and low recording densities at an integral ratio. A multitrack magnetic recording and reproducing device of the present invention is unique in that it is provided with a special reproducing circuit which, when data recorded by a head for low recording density are reproduced by means of a plurality of heads for high recording density, is adapted to determine whether any of the reproduced outputs from the plurality of heads for high recording density corresponding to the head for low recording density is in error. While conventional multitrack magnetic recording and reproducing devices perform addition of analog quantities and hence each track requires its own amplifier, additions are carried out according to the present invention simply by using additional digital multiplexers. Since all circuits shown in FIG. 2 are digital circuits, furthermore, it is possible to provide circuits for only one track and to allow the other tracks to use the same circuits according to a time-sharing program. As for the improvement in signal-to-noise ratio said to be achievable by means of analog addition, a multitrack magnetic recording and reproducing device of the present invention is advantageous because the signal-to-noise ratios of narrow tracks such as $T_a$ and $T_b$ are sufficiently high and data errors are more frequently caused by dropouts and the clogging of heads than by the deterioration in signal-to-noise ratio. The device of the present invention is capable of preventing the deterioration of reproduced data by dropouts and clogging of heads and hence demonstrates extremely superior results from a practical point of view.

This invention has been described above in terms of only a simple embodiment. It is to be understood, however, that the description above has been given for the purpose of illustration and not for limiting the scope of the invention. Various changes and modifications are still to be considered within the scope of the invention as will become apparent to a skilled person in the art.

What is claimed is:

1. In a multitrack magnetic recording and reproducing device which comprises heads for lower and higher recording densities, ratio of said higher recording density to said lower recording density being an integer greater than 1, and is adapted to convert analog signals into digital signals and to record converted signals by splitting onto a plurality of tracks, a reproducing circuit with error-detecting means comprising a first error detection circuit which receives a first demodulated output signal from one of said tracks and to output a first indicator signal indicating whether said first demodulated output signal is correct or incorrect, a second error detection circuit which receives a second demodulated output signal from another of said tracks and to output a second indicator signal indicating whether said second demodulated output signal is correct or incorrect, a first multiplexer which receives said first indicator signal and transmits said first demodulated output signal if said first indicator signal indicates correct and no signal if said first indicator signal indicates incorrect, a second multiplexer which receives said second indicator signal and transmits said second demodulated output signal if said second indicator signal indicates correct and no signal if said second indicator signal indicates incorrect, and a third multiplexer which receives said first and second indicator signals and transmits said first demodulated output signal, said second demodulated output signal or no signal, depending on the combination of said first and second indicator signals.

2. The device of claim 1 wherein said reproducing circuit further comprises a first buffer memory for temporarily storing said first demodulated output signal and transmitting said first demodulated output signal to said first and third multiplexers, and a second buffer memory for temporarily storing said second demodulated output signal and transmitting said second demodulated output signal to said second and third multiplexers.

* * * * *